Oct. 16, 1951 E. R. SANDERS ET AL 2,571,490
STOCK FEED TROUGH
Filed Nov. 1, 1948 2 Sheets-Sheet 1
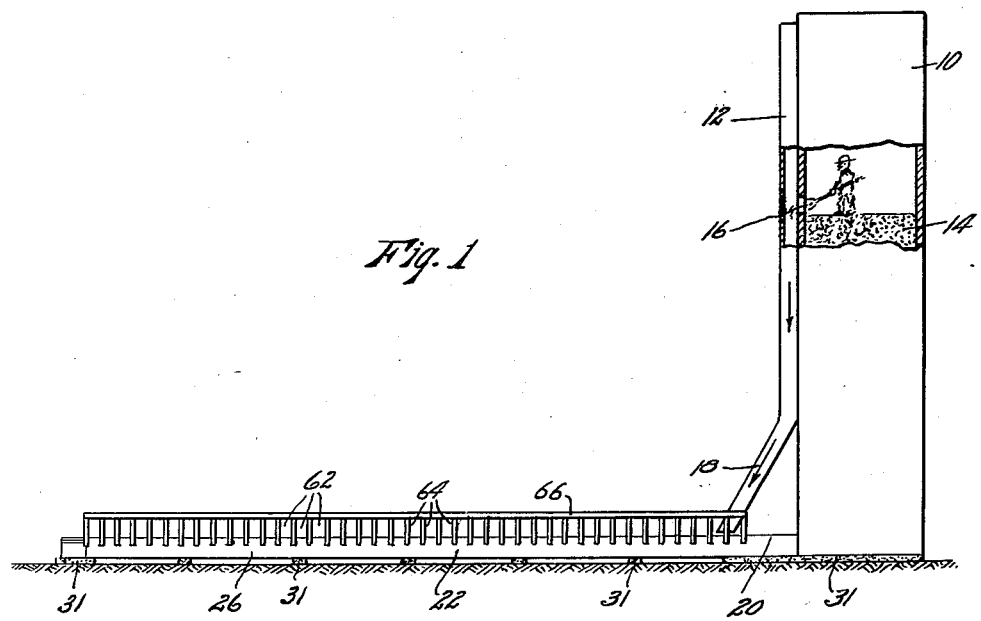
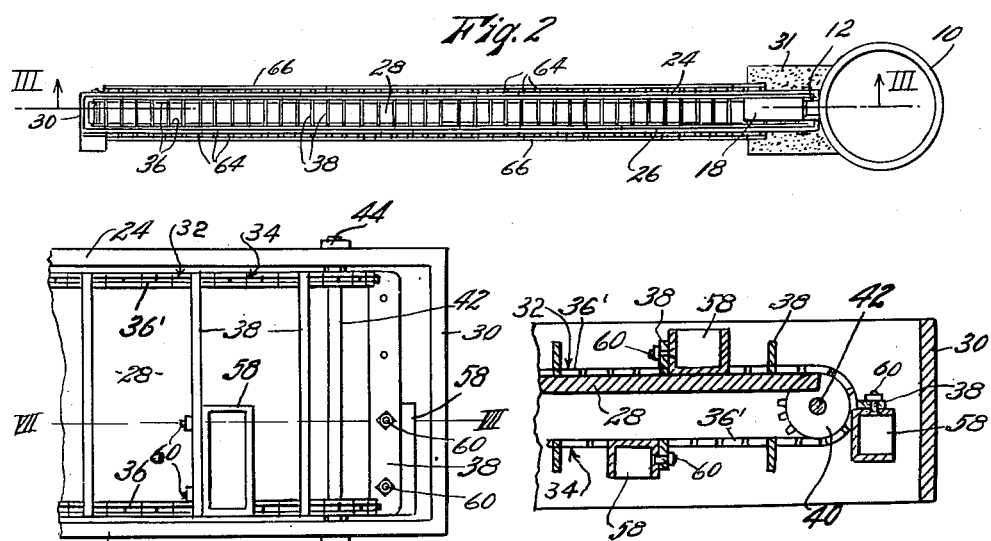
INVENTORS,
Everett R. Sanders,
Maudie M. Sanders.
BY
Roy E. Hamilton,
Attorney.

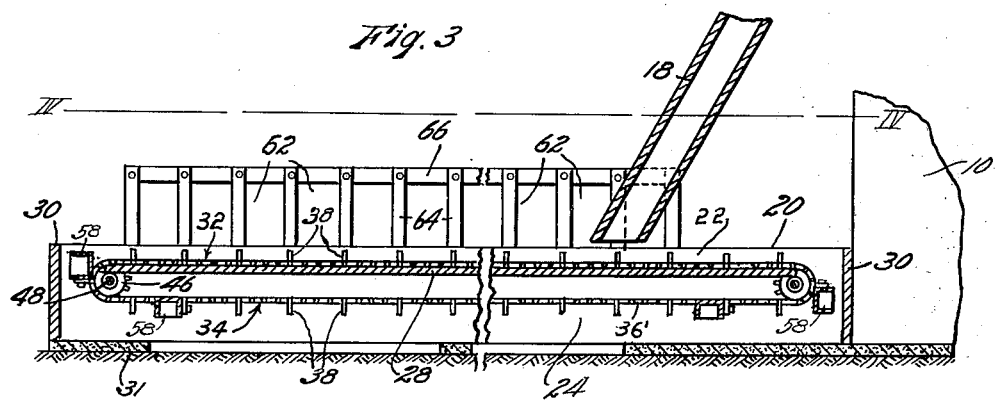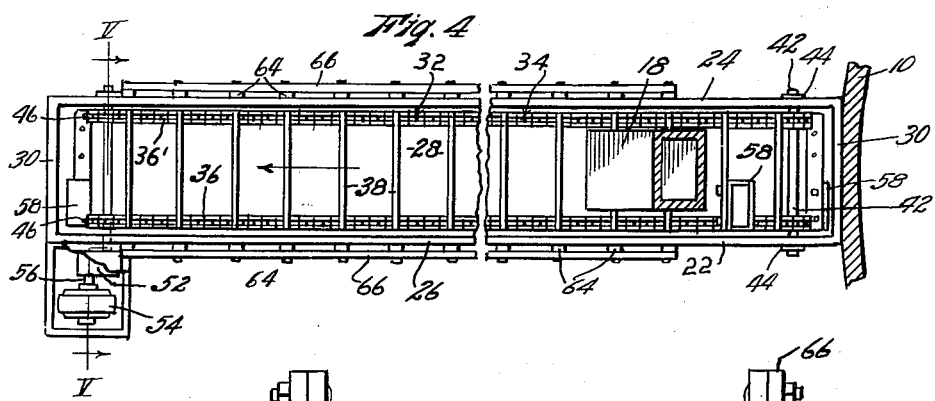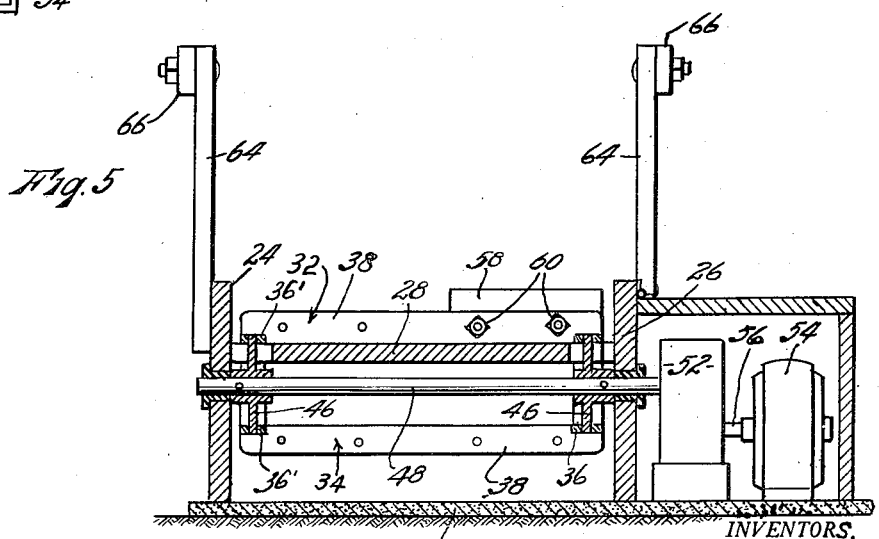

Patented Oct. 16, 1951

2,571,490

UNITED STATES PATENT OFFICE 2,571,490

STOCK FEED TROUGH

Everett R. Sanders and Maudie M. Sanders,
Kansas City, Mo.

Application November 1, 1948, Serial No. 57,736

3 Claims. (Cl. 119—51)

This invention relates to improvements in stock feed troughs wherein feed is automatically distributed throughout the length of an elongated feed trough.

The present system of delivering feed to a feed trough is by placing the feed in a suitable vehicle then driving said vehicle along the side of the feed trough and delivering the feed to the trough from the vehicle by hand.

The present invention contemplates a much easier and more economical method of distributing the feed to the feed trough which requires the services of one man who delivers ensilage, cut hay, etc., from a silo, or grain from a bin to a chute position above one end of an elongated feed trough, having a slow traveling endless conveyor whereby feed is gradually delivered throughout the entire length of the trough to cattle or other animals to be stationed therealong.

A further object of this invention is the provision of an elongated stock feed trough having side walls and a substantially horizontal bottom carrying an endless conveyor with its upper reach riding on said bottom and its lower reach extending lengthwise therebelow.

Another object is the provision of a feed trough having means for distributing rough feed throughout its length and having feed troughs carried by said conveyor whereby individual feeding of concentrated feed, such as grain, may be positioned in spaced apart relation in said trough.

With these objects in view, as well as other objects which will appear during the course of the specification, reference will be had to the drawings wherein:

Figure 1 is a side elevation of a feeding apparatus partly in section, showing a stock feed trough embodying this invention.

Fig. 2 is a plan view of the stock feeding apparatus shown in Fig. 1.

Fig. 3 is an enlarged foreshortened vertical sectional view of the feed trough taken on line III—III of Fig. 2, with the silo left in elevation.

Fig. 4 is a sectional view of the trough taken on line IV—IV of Fig. 3.

Fig. 5 is an enlarged cross sectional view taken on line V—V of Fig. 4.

Fig. 6 is an enlarged plan view of the inner end of the trough.

Fig. 7 is a sectional view taken on line VII—VII of Fig. 6.

Throughout the several views, like reference characters refer to similar parts and the numeral 10 designates a silo, bin or any other ocntainer for a large quantity of cut feed or grain.

This silo has a suitable side chute 12 into which feed 14 is delivered through side opening 16. The lower end portion 18 of chute 12 extends outwardly from the silo to overhang the inner end portion 20 of trough 22.

Trough 22 comprises a pair of spaced apart side walls 24 and 26 joined together by a floor member 28 and a pair of end members 30. The side walls and end members rest on suitable base member 31 preferably made of rock or concrete whereby the trough, which is usually made of planks is positioned above the ground.

It will be noted that the substantially planar floor member 28 is positioned above the vertical center of the side walls, and serves as a support for the upper reach 32 of the endless conveyor 34. The conveyor comprises a pair of spaced apart sprocket chains 36 and 36', joined together by transversely disposed, spaced-apart flights 38. The inner end of the loop formed by conveyor 34 is carried by a pair of spaced apart sprocket wheels 40 mounted for rotation with a transverse axle 42 mounted for rotation in bearings 44 inserted in side walls 24 and 26. The other end of the conveyor loop is mounted on sprocket wheels 46 carried for rotation with shaft 48 which is mounted for rotation in bearings 50 securely mounted in side walls 24 and 26. One end of shaft 48 extends through wall 26 and is connected with the slow drive of a standard speed reducing gear 52. A motor 54 having a shaft 56 is connected with the high speed side of speed reducing gear 52, whereby when the motor is energized the conveyor will be driven at an exceedingly low rate of speed.

The speed of the conveyor is so regulated that sufficient feed may be delivered through chute 18 to properly charge the conveyor as it moves therebeneath.

When it is necessary to feed the stock grain in this trough it is convenient to provide a series of feed boxes 58 which are respectively secured to conveyor flights 38 by means of bolts 60. It is contemplated that the upper reach of the conveyor shall always move outwardly from the silo, so that when the filled portion of the conveyor reaches the outer end of the trough the motor will be stopped, until such time as another feeding is required.

The trough is made wide enough so that a line of stock may be fed from each side. Feeding openings 62 are formed by upright beams 64 secured at their lower ends to the respective side walls 24 and 26, and secured together at their upper ends by longitudinal bars 66. These feeding openings are of a size suitable for receiving a cow's head therethrough to permit the animal to eat from the trough within a limited zone. When dairy cows are being fed it is desirable to feed different amounts of heavier grain feed to each cow. This is made possible by providing a feed box for each feeding opening which is charged with the required amount of feed by an operator positioned at the inner end of the trough adjacent the silo.

From the above description it is apparent that the feed trough may be charged with a full feed of rough feed from the silo by closing the electric switch to energize the motor 54 and deliver feed through chutes 12 and 18 to the trough as the upper reach thereof is moved slowly outwardly. Should it be desired to also feed grain with the rough feed or without the rough feed a man located at the inner end of the trough may charge the various feed boxes 58 with any desired amount of grain.

What we claim as new and desire to protect by Letters Patent is:

1. A stock feed trough comprising side walls joined together adjacent their upper edges by a substantially planar floor member, an endless conveyor comprising a pair of spaced apart chains joined together by transverse flights and operatively mounted with its upper reach resting on said planar floor member, and feed boxes removably attached to certain of said flights to move with said conveyor along said planar floor member.

2. A stock feed trough comprising side walls joined together adjacent their upper edges by a substantially planar floor member, an endless conveyor comprising a pair of spaced apart chains joined together by transverse flights and operatively mounted with its upper reach resting on said planar floor member, feed boxes removably attached to certain of said flights to move with said conveyor along said planar floor member, said side-walls having longitudinally-spaced feeding openings formed therein.

3. A stock feed trough comprising side walls joined together adjacent their upper edges by a substantially planar floor member, an endless conveyor comprising a pair of spaced apart chains joined together by transverse flights and operatively mounted with its upper reach resting on said planar floor member, feed boxes removably attached to certain of said flights to move with said conveyor along said planar floor member, power means for driving said conveyor, said side-walls having longitudinally-spaced feeding openings formed therein.

EVERETT R. SANDERS.
MAUDIE M. SANDERS.

REFERENCES CITED

The following references are of record in the file of this patent:

UNITED STATES PATENTS

| Number | Name | Date |
|---|---|---|
| 112,133 | Farquhar | Feb. 28, 1871 |
| 291,625 | Robbins | Jan. 8, 1884 |
| 632,171 | Bolinski | Aug. 29, 1899 |
| 691,439 | Campbell | Jan. 21, 1902 |
| 804,057 | Scott | Nov. 7, 1905 |
| 1,197,060 | Petersen et al. | Sept. 5, 1916 |
| 1,375,961 | Hart | Apr. 26, 1921 |
| 2,302,314 | Haggart | Nov. 17, 1942 |